(No Model.)
W. BURROWS.
MANGER.
No. 336,209. Patented Feb. 16, 1886.
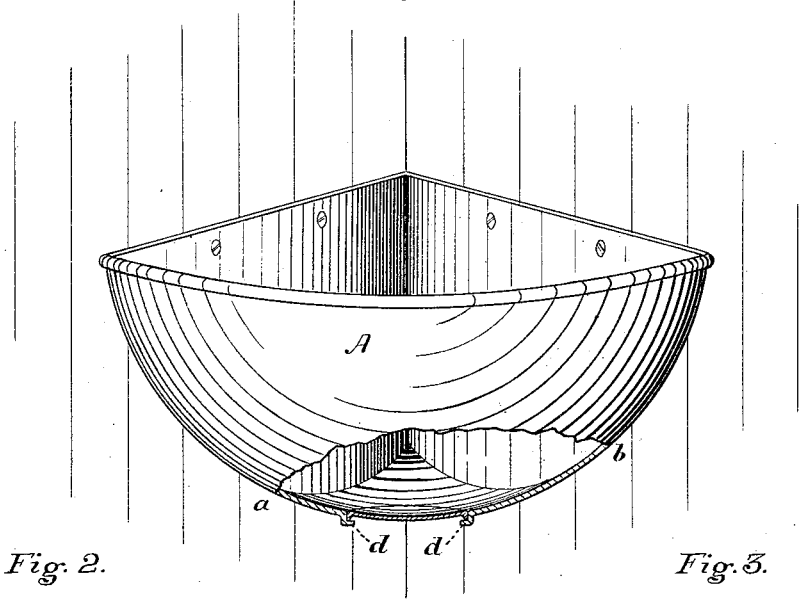
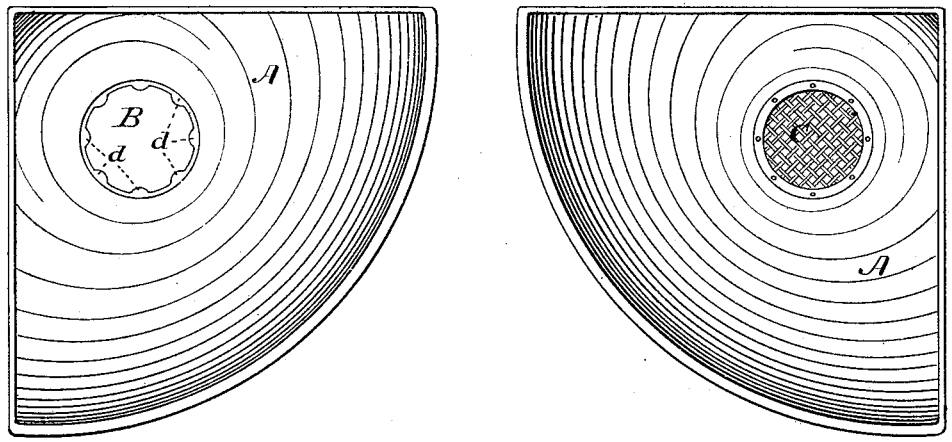
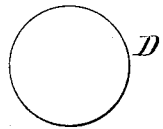 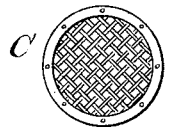
WITNESSES:
INVENTOR
William Burrows

UNITED STATES PATENT OFFICE.

WILLIAM BURROWS, OF BROOKLYN, NEW YORK.

MANGER.

SPECIFICATION forming part of Letters Patent No. 336,209, dated February 16, 1886.

Application filed December 15, 1884. Serial No. 150,366. (No model.)

*To all whom it may concern:*

Be it known that I, WILLIAM BURROWS, of Brooklyn, in the county of Kings and State of New York, have invented an Improvement in Cast-Iron Mangers, of which the following is a specification.

Cast-iron mangers are usually made with rounding bottoms, and dust and pieces of stalks and other foreign substances in the feed accumulate in the same and are inconvenient to remove. Besides this, the dust and objectionable particles usually found with oats pass into the horse's nostrils, because there is no escape for the same at the bottom of the manger.

My present invention consists in a cast-iron manger having a flanged opening through the bottom thereof and a removable section formed of a fine screen, such section filling such opening and resting upon the flanges, so that the dust and foreign matter in the feed may sift down and pass away, either in consequence of the agitation by the horse in feeding or from the agitation of the attendant's hand after the feed has been introduced into the manger; and I provide a tight movable section that can be used to fill the opening in the manger when the screen-section is removed, so as to adapt the said manger to other kinds of feed than those before named.

In the drawings, Figure 1 is a perspective view of the manger, partially broken open at *a b* to show the lower part in section. Fig. 2 is a plan view showing the flanged opening. Fig. 3 is a similar view with the screen in place. Fig. 4 is a detached plan and section of the closed filling-section, and Fig. 5 is a plan and section of the screen.

The manger A is of cast-iron, with a rounding bottom, and of any usual shape. The opening B through the bottom is made with the flanges or projections *d*, to support the removable section D or C, with its upper surface flush, or nearly so, with the inner surface of the iron manger. The section C may be of fine wire-netting within, and clamped by surrounding frame-pieces; or it may be of perforated metal. In either case it allows the dust and dirt to sift away from the feed.

I claim as my invention—

The cast-iron manger having an opening through the bottom and a flange around said opening jointly with the removable sections filling the opening and resting on the flanges, so as to be flush, or nearly so, with the interior of the manger, substantially as and for the purposes set forth.

WILLIAM BURROWS.

Witnesses:
THOS. M. WYATT,
CHAS. A. REED.